Patented Mar. 23, 1943

2,314,443

UNITED STATES PATENT OFFICE 2,314,443

PURIFICATION OF ALPHA CHLOROACRYLIC COMPOUNDS PRELIMINARY TO POLYMERIZATION

John William Croom Crawford, Frodsham, and Nancy McLeish, Runcorn, England, assignors to Imperial Chemical Industries Limited, a corporation of Great Britain No Drawing. Application August 30, 1939, Serial No. 292,746. In Great Britain September 5, 1938

11 Claims. (Cl. 202—57)

This invention relates to methods for the improvement of chloroacrylic compounds, particularly the monomeric esters of chloroacrylic acid, and to the manufacture of polymerisation products from such compounds.

It has been observed that alpha-chloroacrylic acid and its esters polymerise under the influence of light or of catalysts such as benzoyl peroxide to form resins. In many cases it seemed that it would be possible to obtain from these bodies transparent colourless resins of attractive appearance. However, a serious disadvantage appeared in that the attractive appearance of the resins was marred by a yellowish colouration, which sometimes was apparent immediately after polymerisation, while at other times it developed only after a lapse of time or when the materials were heated.

This invention has as an object to devise a method whereby this yellowish colour can be prevented from appearing. A further object is to devise a method whereby the cause of this yellowish colour can be removed from the monomer before polymerisation. A still further object is to devise a method of obtaining colourless polymers of alpha-chloroacrylic acid and its esters. A still further object is to provide colourless polymers of alpha-chloroacrylic acid and its esters. Further objects will appear hereinafter. These objects are accomplished by the following invention.

We have discovered that this generation of colour is due to the presence in the monomer of traces of autoxidation products, or, when the colour is generated in the polymer on standing, to the autoxidation of traces of monomer remaining in the product due to incomplete polymerisation. The presence of these autoxidation products is usually accompanied by the development of acidity and by the presence in the product of traces of aldehydic compounds, especially formaldehyde.

Accordingly the invention comprises submitting a monomeric alpha-chloroacrylic compound which is subsequently to be polymerised to a treatment to free it from autoxidation products.

According to a further feature the invention comprises the treatment of a monomeric alpha-chloroacrylic compound to remove autoxidation products and the subsequent polymerisation of the treated material, preferably in the absence of atmospheric oxygen.

According to a still further feature of the invention polymeric alpha-chloroacrylic products having relatively little colour are prepared by effecting the polymerisation of a monomeric alpha-chloroacrylic compound free from autoxidation products by the action of light and/or by heating in the presence of an organic acid peroxide such as benzoyl peroxide or acetyl peroxide, preferably in the absence of atmospheric oxygen.

Suitable monomeric alpha-chloroacrylic compounds to use in our invention are those having the general formula

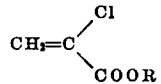

R being hydrogen or a monovalent radicle, e. g. an alkyl, aralkyl or aryl group. We may also use mixtures of such compounds with each other, or with other compounds capable of forming interpolymers therewith. Plasticizers, softeners, fillers and other bodies capable of modifying the physical character of the product may also be present during the polymerisation step.

The treatment of the monomeric alpha-chloroacrylic compounds to remove autoxidation products may be effected by physical or chemical methods. Thus the monomeric bodies may be distilled in the substantial absence of oxygen, e. g. in vacuo or in an atmosphere of nitrogen to separate the monomeric compound from the autoxidation product, or the compounds may be treated with a reagent such as is subsequently exemplified whereby the autoxidation products are destroyed. Preferably these two methods are combined, i. e. the monomeric body is treated with one of the reagents specified and then distilled in the absence of atmospheric oxygen.

The first of these methods may be carried out very conveniently by first sweeping out the apparatus for the distillation with nitrogen and then evacuating to a high vacuum, e. g. a pressure of 0.5 mm. of mercury. The chloroacrylic compound will then distil and be collected in the receiver which is kept cool by a refrigerant bath. Preferably the polymerisation of the treated monomer is carried out immediately to avoid as much as possible exposing the distilled material to the air; alternatively, it may be stored under anaerobic conditions until it is required for polymerisation.

In the second of the methods in which a monomer containing autoxidation products is treated to remove or destroy such products, the treatment may be effected with a reducing agent or with hydrogen peroxide, or with a perborate or other per-compound, or with a compound such as potassium permanganate which has a labile oxygen atom, i. e. an oxygen atom which on reaction with hydrogen peroxide splits off from the compound with formation of free oxygen. By these treatments the autoxidation product is destroyed, and the polymerisation can then be effected by the methods specified above to give polymers of but little colour. Preferably, however, the chemical treatment is accompanied or followed by treatment with an alkaline reacting compound, since thereby the decomposition products of the autoxidation products are removed. Examples of alkaline reacting compounds which may be used include water-soluble carbonates, bicarbonates or borates; alkali metal hydroxides may also be used though we prefer not to use them since they may also induce hydrolysis of the esters, or form salts with the acid as the case may be.

The treatment with the reducing or oxygen-containing substance may be carried out conveniently by agitating the monomeric body with an aqueous solution of the chosen substance and then allowing the mixture to stand, when the alpha-chloroacrylic ester forms a separate layer which can be isolated by decantation; treatment with the alkaline substance may be given similarly. Alternatively, the monomer may be treated with a single solution containing either a reducing agent or an oxygen-containing compound together with an alkaline compound, e. g. alkaline permanganate solution, or a solution of hydrogen peroxide and a carbonate. It will, of course, be appreciated that when it is desired to use as the alkaline substance a compound having reducing properties, e. g. a sulphite, it must not be used simultaneously with a permanganate or other labile oxygen-containing compound.

The following examples illustrate but do not limit our invention, all parts being by weight:

*Example 1*

A sample of methyl alpha-chloroacrylate which, through storage, had undergone autoxidation with consequent formation of sufficient acidity to fume slightly in moist air, was divided into two portions. One portion was washed with a 5% sodium carbonate solution to remove the acidity; then with 1% hydrogen peroxide and finally with water. It was then dried over calcium chloride, distilled, and polymerised by heating at 55° C. in the presence of 0.025% benzoyl peroxide. From the polymer a cylinder 7 cm. long was cut and its ends polished. The colour of the cylinder (viewed along its axis) was determined with a Lovibond tintometer and was found to be red 0.3 Lovibond unit, yellow 0.8 Lovibond unit. For comparison the second portion was polymerised in like manner without any prior treatment. A cylinder of the resin thus obtained 7 cm. long appeared bright yellow when viewed along its axis.

*Example 2*

The material used was methyl alpha-chloroacrylate which through storage had undergone autoxidation. It had an acid reaction equivalent to 6.5 ml. of N/10 alkali per 5 ml. of ester, and gave strong positive Schryver and pyridine tests.

A portion of the ester was washed with an aqueous solution of sulphur dioxide, then with water. It was dried and re-distilled. A sample of this treated ester was substantially neutral and gave no colour in the Schryver and pyridine tests. The remainder of the treated ester was polymerised by heating at 60° C. in the presence of 0.01% benzoyl peroxide and the colour measured as before. A 7 cm. cylinder had a colour of red 0.2 unit, yellow 0.4 unit and after heating for 15 hours at 100° C. red 0.5 unit, yellow 1.2 units.

For comparison another portion of the ester was polymerised without previous treatment by heating it to 60° C. in the presence of 0.01% benzoyl peroxide; a 7 cm. cylinder was cut from the resin thus obtained. The colour of the cylinder determined as in Example 1 was red 0.6 unit, yellow 2.1 units, and after heating at 100° C. for 16 hours the colour was red 1.8 units and yellow 8.3 units.

*Example 3*

A further batch of the ester of Example 2 weighing 60 parts was washed with 4.4 parts of phenylhydrazine dissolved in 30 parts of water. A precipitate formed which was filtered off and a further 2.2 parts of phenylhydrazine were added to the filtered water-ester mixture. The ester was then separated by decantation, washed with water and dried over calcium chloride. It was then submitted to fractional distillation. The distilled ester was then polymerised by heating for 15 hours at 60° C. with 0.01% benzoyl peroxide. The colour of the resulting resin was determined by the method of Example 1 and was red 0.3 unit, yellow 0.9 unit; after heating at 100° C. for 16 hours the colour was red 0.6, yellow 2.1 units.

*Example 4*

Methyl alpha-chloracrylate which had acquired sufficient acidity through autoxidation to fume in moist air was divided into three portions. One portion of the ester was washed with 2N sodium carbonate solution containing 1% hydrogen peroxide, and after washing with water was dried and re-distilled. The distillate was polymerised in the same manner as the untreated portion (see below) and then had a colour determined as in Example 1 of red 0.2 unit, yellow 0.4 unit, and after further heating for 15 hours at 100° C. the colour was red 0.5 unit, yellow 0.9 unit. A second portion of the ester was washed with 2N sodium carbonate solution containing 5% sodium hydrosulphite $Na_2S_2O_4$, washed with water and then dried and distilled. The distilled ester was polymerised as for the previous portion and the colour, determined as in Example 1 was red 0.5 unit, yellow 1.0 unit. Substantially no change in colour occurred after a further heating to 100° C. for 15 hours.

For a comparison the third portion was polymerised without previous treatment by heating at 60° C. in the presence of 0.02% benzoyl peroxide and had a colour, determined as in Example 1, of red 0.8 unit, yellow 2.1 units. After a further heating at 100° C. for 15 hours the colour was red 1.1 units, yellow 2.9 units.

*Example 5*

An amount of methyl alpha-chloroacrylate weighing 62.5 parts which has become autoxidised through storage for thirteen days was shaken up with 100 parts of 2% sodium persulphate solution and was then washed with water and distilled under reduced pressure in the presence of a small amount of a stabilizer—hydroquinone.

The purified ester was then polymerized by heating in a sealed tube in the presence of 0.025% of benzoyl peroxide. From the polymeric resin thus obtained a cylinder 7 cm. long was cut and polished, and the colour viewed along the axis was determined with a Lovibond tintometer. The cylinder was then heated to 100° C. for 15 hours, and the colour again determined in a similar manner.

Before reheating the polymer had a colour of red 0.4 unit and yellow 0.9 unit, and after reheating a colour of red 0.8 unit and yellow 2.6 units.

A portion of the ester which had not been treated with any reagent was polymerised in the same way and its colour determined by the same method. Before heating the colour of the polymerised untreated ester was red 0.4 unit, yellow 2.5 units, and after heating at 100° C. for 15 hours it was red 1.2 units, yellow 5.1 units.

*Example 6*

The same weight of a further portion of the monomer used in Example 1 was treated as in Example 5 but using in place of the sodium persulphate solution 100 parts of 2% sodium perborate. The ester was polymerised in the same way and its colour determined by the same method. Before the reheating its colour was red 0.6 unit, yellow 0.6 unit, and after reheating it was red 0.4 unit, yellow 0.9 unit.

*Example 7*

A third portion of methyl alpha-chloroacrylate of the same origin as that used in Example 5 and weighing 62.5 parts was treated as in that example but using instead of the persulphate solution 100 parts of sodium hypochlorite solution containing 2.8 parts of available chlorine. The treated ester was polymerised in the same way, and its colour determined in the same manner.

Before reheating its colour was red 0.5 unit, yellow 1.0 unit, and after reheating was red 0.5 unit, yellow 2.2 units.

*Example 8*

A distillation apparatus of glass was swept out with a current of nitrogen freed from traces of oxygen by passage over hot copper turnings, and the surfaces of the glass warmed in a flame. Methyl alpha-chloroacrylate was then introduced into the distillation vessel and 0.04 part of benzoyl peroxide were inserted in the receiver. The apparatus was then washed out again with nitrogen, the supply of nitrogen cut off, and the pressure reduced to 5 mms. of mercury, and 65 parts of ester distilled over. The distillate containing the benzoyl peroxide was then polymerised by exposure to daylight when a resin was obtained. The colour of the resin was determined as in the previous example, and was found to be red 0.3 unit, yellow 0.6 unit, and after heating for 17 hours, it was red 0.2 unit, yellow 0.7 unit.

*Example 9*

A sample of n-propyl alpha-chloroacrylate which had been stored for some months in the presence of an antipolymerisation stabilizer (hydroquinone) and had become deeply coloured was distilled under reduced pressure to free it from stabiliser. One portion of the distilled ester was washed with water in which was dissolved 2% of sodium hydrosulphite ($Na_2S_2O_4$) and 2% of sodium carbonate and then with water. It was then dried, redistilled under reduced pressure and polymerised by heating at 60° C. with 0.025% benzoyl peroxide. The polymer then had a colour, determined as in Example 1, of red 0.6, yellow 1.3. Another portion of the ester freed from stabiliser by distillation was polymerised under the same conditions without washing or other intermediate treatment. Its colour measured as in Example 1 was red 2.5 units, yellow 11.0 units.

*Example 10*

A sample of isopropyl alpha-chloroacrylate which had been stored for some months in the presence of an antipolymerisation stabiliser (resorcinol) and had become deeply coloured was distilled under reduced pressure to free it from stabiliser. One portion of the distilled ester was washed with an aqueous solution containing 2% sodium hydrosulphite and 2% sodium carbonate and then with water. It was then dried, redistilled under reduced pressure and polymerised by heating at 60° C. with 0.025% benzoyl peroxide. The polymer then had a colour, measured as Example 1, of red 0.7 unit, yellow 2.6 units. Another portion of the ester which had been separated from stabiliser was polymerised under the same conditions without washing or other intermediate treatment, and had a colour measured as in Example 1 of red 1.3 units, yellow 4.8 units.

It is not essential to employ the reagents in solution for they may be used as solids, e. g. an alpha-chloroacrylic ester may be shaken with a ground mixture of solid reducing agent and solid alkaline material and the treated product filtered and/or distilled off. Alternatively, the alpha-chloroacrylic ester may be filtered through a double layer of solid, the upper layer comprising the reducing agent and the lower one the alkaline substance.

Prior to the treatment with a reducing agent or oxidising agent the monomer may be given a wash with alkali to free it from any acid decomposition products which may be present.

Subsequent to the treatment by a chemical method the monomer is preferably distilled in the substantial absence of atmospheric oxygen, as described above, but if desired it may be polymerised directly.

The adequacy of the treatment given to the alpha-chloroacrylic esters to fit them for use in the manufacture of polymers having little colour is readily tested, for it is found that esters satisfactory for that purpose are substantially neutral (as determined by agitating the treated monomer with water and an indicator such as methyl red), give no colour on treatment with phenylhydrazine and aqueous ferricyanide (Schryver test) nor on warming with dilute aqueous pyridine. Tests for the presence of oxidation products as by shaking with acidified aqueous potassium iodide, or ferric ferricyanide solution may also be applied, a negative result indicating the suitability of the ester for the manufacture of polymers having but little colour. These tests may also be used as criteria to select for polymerisation a monomer which is not known to be suitable by reason of its previous treatment.

In the case of the alpha-chloroacrylic acid, of course, the test for neutrality will not be applicable though the other tests may be used to indicate the absence of oxidation products. In treating the acid by the methods of this invention which involve the use of alkaline compounds, salts of the acid will be the immediate product; the acid itself, however, may be recovered by treatment with a strong acid, e. g. dilute hydrochloric acid, extraction with solvent such as ether or benzene, followed by evaporation of the solvent from the solution so obtained. Thus the acid may be treated with dilute sodium carbonate, the resulting liquid acidified with hydrochloric acid, extracted with ether and the ether boiled off. We may also treat the acid itself in solution; thus a solution of the acid in ether may be washed with dilute permanganate solution and then with water. The ether may then be evaporated off after drying the solution.

The subsequent polymerisation may be carried out so as to produce cast or moulded articles, or the monomer may be polymerised in globular suspension resulting in the formation of an emulsified polymer. The monomers treated according to our invention may also be used in the manufacture of resins by inter-polymerising them with a second polymerisable compound, or with a compound such as angelic acid or tiglic acid which while not itself capable of polymerisation forms interpolymers with polymerisable alpha-beta-unsaturated compounds.

As many apparently widely different embodiments of this invention may be made without departing from the spirit and scope thereof, it is to be understood that the invention is not limited to the specific embodiments thereof except as defined in the appended claims.

We claim:

1. In a process for the preparation of a polymer of a compound of the class consisting of alpha-chloroacrylic acid and esters thereof, the step which comprises destroying any autoxidation products in the monomer by treating with a compound containing an element of readily changed valence of the class which consists of reducing agents and compounds containing a labile oxygen atom followed by separating the monomer from the decomposition products of the autoxidation products and from any undestroyed autoxidation products by distillation in the absence of oxygen.

2. In a process for the preparation of a polymer of a compound of the class consisting of alpha-chloroacrylic acid and esters thereof, the step which comprises destroying any autoxidation products in the monomer by treating with a compound containing an element of readily changed valence of the class which consists of reducing agents and compounds containing a labile oxygen atom followed by a treatment with an inorganic alkaline reacting compound and thereafter separating the monomer from the decomposition products of the autoxidation products and from any undestroyed autoxidation products by distillation in the absence of oxygen.

3. In a process for the preparation of a polymer of a compound of the class consisting of alpha-chloroacrylic acid and esters thereof, the step which comprises destroying any autoxidation products in the monomer by treating with a hydrogen peroxide and thereafter separating the monomer from the decomposition products of the autoxidation products and from any undestroyed autoxidation products by distillation in the absence of oxygen.

4. In a process for the preparation of a polymer of a compound of the class consisting of alpha-chloroacrylic acid and esters thereof, the step which comprises destroying any autoxidation products in the monomer by treating with a hydrosulphite and thereafter separating the monomer from the decomposition products of the autoxidation products and from any undestroyed autoxidation products by distillation in the absence of oxygen.

5. In a process for the preparation of a polymer of a compound of the class consisting of alpha-chloroacrylic acid and esters thereof, the step which comprises destroying any autoxidation products in the monomer by treating with sodium hydrosulphite and thereafter separating the monomer from the decomposition products of the autoxidation products and from any undestroyed autoxidation products by distillation in the absence of oxygen.

6. A method as claimed in claim 2 in which the alkaline reacting compound is a carbonate.

7. A method as claimed in claim 2 in which the alkaline reacting compound is a bicarbonate.

8. A method as claimed in claim 2 in which the alkaline reacting compound is a borate.

9. In a process for the preparation of a polymer of a compound of the class consisting of alpha-chloroacrylic acid and esters thereof, the step which comprises destroying any autoxidation products in the monomer by treating with a reducing agent followed by separating the monomer from the decomposition products of the autoxidation products and from any undestroyed autoxidation products by distillation in the absence of oxygen.

10. In a process for the preparation of a polymer of a compound of the class consisting of alpha-chloroacrylic acid and esters thereof, the step which comprises destroying any autoxidation products in the monomer by treating with a compound containing a labile oxygen atom followed by separating the monomer from the decomposition products of the autoxidation products and from any undestroyed autoxidation products by distillation in the absence of oxygen.

11. In a process for the preparation of a polymer of a compound of the class consisting of alpha-chloroacrylic acid and esters thereof, the step which comprises destroying any autoxidation products in the monomer by treating with an inorganic compound containing an element of readily changed valence and of the class consisting of reducing agents and compounds containing a labile oxygen atom followed by separating the monomer from the decomposition products of the autoxidation products and from any undestroyed autoxidation products by distillation in the absence of oxygen.

JOHN WILLIAM CROOM CRAWFORD.
NANCY McLEISH.